US012075206B2

(12) United States Patent
Krishnakumar et al.

(10) Patent No.: US 12,075,206 B2
(45) Date of Patent: Aug. 27, 2024

(54) ADJUSTABLE IN EAR MODULE

(71) Applicant: Dell Products L.P., Round Rock, TX (US)

(72) Inventors: Karthikeyan Krishnakumar, Austin, TX (US); Wong Hin Loong Justin, Singapore (SG)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 17/844,854

(22) Filed: Jun. 21, 2022

(65) Prior Publication Data

US 2023/0412958 A1 Dec. 21, 2023

(51) Int. Cl.
*H04R 25/00* (2006.01)
*H04R 1/10* (2006.01)

(52) U.S. Cl.
CPC .................................. *H04R 1/1016* (2013.01)

(58) Field of Classification Search
CPC .................................................... H04R 1/1016
USPC ............................. 381/1, 370, 380, 381, 371
See application file for complete search history.

(56) References Cited

U.S. PATENT DOCUMENTS 11,638,084 B2 * 4/2023 Keady .................... A61F 11/08 381/380
2010/0008530 A1 1/2010 Hlas et al.
2011/0135136 A1 * 6/2011 Kim ..................... H04R 1/1058 381/380
2012/0128192 A1 * 5/2012 Burgett ................ H04R 1/1016 381/380
2013/0092470 A1 * 4/2013 Johnston .............. H04R 1/1016 181/129
2014/0205125 A1 7/2014 Triato
2016/0127818 A1 * 5/2016 Ambrose ............. H04R 1/1066 381/380
2017/0245044 A1 * 8/2017 Cartwright ........... H04R 1/2811
2017/0339481 A1 * 11/2017 Laberge ............... H04R 1/1016
2019/0327549 A1 * 10/2019 Lin ...................... H04R 1/1016
2023/0008803 A1 * 1/2023 Reichert ............... H04W 4/023

OTHER PUBLICATIONS

ZDNET Techonology, "Logitech Zone True Wireless earbuds, hands on: Impressive but pricey," downloaded from https://www.zdnet.com/article/logitech-zone-true-wireless-earbuds-hands-on/ on Feb. 10, 2023, 11 pages.

(Continued)

*Primary Examiner* — William J Deane, Jr.
(74) *Attorney, Agent, or Firm* — ZAGORIN CAVE LLP; Robert W. Holland

(57) ABSTRACT

An information handling system presents audible sounds from audio information at an in-ear monitor having a speaker in a speaker housing that directs sound through a speaker tube. An angular alignment mechanism adjusts the angular orientation of the speaker tube relative to the speaker housing and a vertical alignment mechanism adjust the distance that the speaker tube extends out from the speaker housing. Position sensors detect the position of the ear tube so that an audio processor can apply the position to adjust the sound output from the speaker and the noise cancellation provided in response to external noise detected by a microphone within the speaker housing.

20 Claims, 11 Drawing Sheets

(56) References Cited

OTHER PUBLICATIONS

Tom's Guide, "Apple AirPods Pro vs. Jabra Elite 85t: Which earbuds are best?," downloaded from https://www.tomsguide.com/news/apple-airpods-pro-vs-jabra-elite-85t on Feb. 10, 2023, 36 pages.
Apple, "Compare AirPods Models," AirPods Pro (2nd Generation), downloaded from https://www.apple.com/airpods/compare/?modelList=airpods-pro,airpods-3rd-gen on Feb. 10, 2023, 2 pages.

* cited by examiner

ADJUSTABLE IN EAR MODULE

BACKGROUND OF THE INVENTION

Field of the Invention

The present invention relates in general to the field of information handling system audio devices, and more particularly to an information handling system adjustable in ear module.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Portable information handling systems often serve as entertainment tools that present audiovisual information, such as movies and music. In many instances, an end user has to listen to audiovisual presentations through earphones rather than playing audio by speakers of the information handling system, such as in crowded locations like a an airplane. Typically the information handling system communicates the audio information by wireless signals, such as Bluetooth, to an in ear module for presentation. In ear modules, also known as earbuds, have a speaker housing with an integrated speaker that presents audio information as audible sounds through an ear tip inserted in an end user ear. The construction of the ear tip and its positioning at the ear canal impacts both the end user's comfort when wearing the in ear module and the quality of sound output to the end user. A good fit of the ear tip ensures a proper air seal and good acoustic performance. An improper fit not only degrades the acoustic performance but also can cause physical discomfort to the wearer. Human ear canal shapes vary substantially from person to person so that one ear tip size cannot easily adapt to multiple end users. When selecting an in ear module, end users cannot typically try on different in ear modules due to hygienic concerns. As an alternative, some in ear modules remove the ear tip and fit on replacement ear tips of different sizes. In some instances, the ear tip position flexes on the end of the in ear module speaker tube. These solutions can offer some increase in comfort, however, different positions have different acoustical performance that can detract from the end user acoustical experience.

SUMMARY OF THE INVENTION

Therefore, a need has arisen for a system and method which adjusts an in ear module fit in an end user ear.

In accordance with the present invention, a system and method are provided which substantially reduce the disadvantages and problems associated with previous methods and systems for inserting in ear modules in end user ears to play audio information from an information handling system. An in ear module extends a speaker tube from a speaker housing to direct speaker audible sound output to an ear tip. The orientation and distance of the ear tip relative to the speaker housing adjust by changes to the position of the speaker tube to enhance end user comfort when wearing the in ear module.

More specifically, an information handling system processes information with a processor and memory to output audio information for presentation as audible sounds at an in ear module, such as by wireless communication from the information handling system to an audio processor of the in ear module. The in ear module has a speaker interfaced with the audio processor to generate audible sounds within a speaker housing that are then directed out a speaker tube to an ear tip for presentation to an end user. An alignment mechanism couples the speaker tube to the speaker housing at selectable angular orientation, such as with sliding curved members that adjust the speaker tube alignment between three detents. A position sensor detects the orientation of the speaker tube so that the audio processor can apply the orientation to tune the audio sound output, such as with a tuning profile stored for each orientation. Similarly, a vertical actuator couples to the speaker tube to adjust the distance of the ear tip from the speaker housing by extending and retracting the speaker tube relative to the speaker housing. For example, a circular gear exposed at the speaker housing rotationally interfaces with a rack integrated with the speaker housing to move the speaker tube coupled to the speaker housing. A position sensor detects the speaker tube position so that the audio processor can apply the position to tune audible sounds generated at the speaker.

The present invention provides a number of important technical advantages. One example of an important technical advantage is that an end user can adjust an in ear module ear tip position to enhance the fit at the end user's ear. The improved fit provides a better seal of the ear tip against the end user ear and ear canal shape to improve the sound presented to the end user and the comfort of the in ear module in the end user's ear. For example, the orientation of the ear tip relative to the speaker housing and the distance between the ear tip and the speaker housing adjust between positions defined by detents and monitored by a position sensor, such as via the position of the speaker tube extending from the speaker housing. The position of the speaker tube detected by the position sensor is provided to the audio processor so that sounds output by the speaker are tuned for the ear tip position selected by the end user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An in ear monitor adjusts speaker tube orientation and height relative to a speaker housing to enhance end user comfort when listening to audible sounds generated from audio information by an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
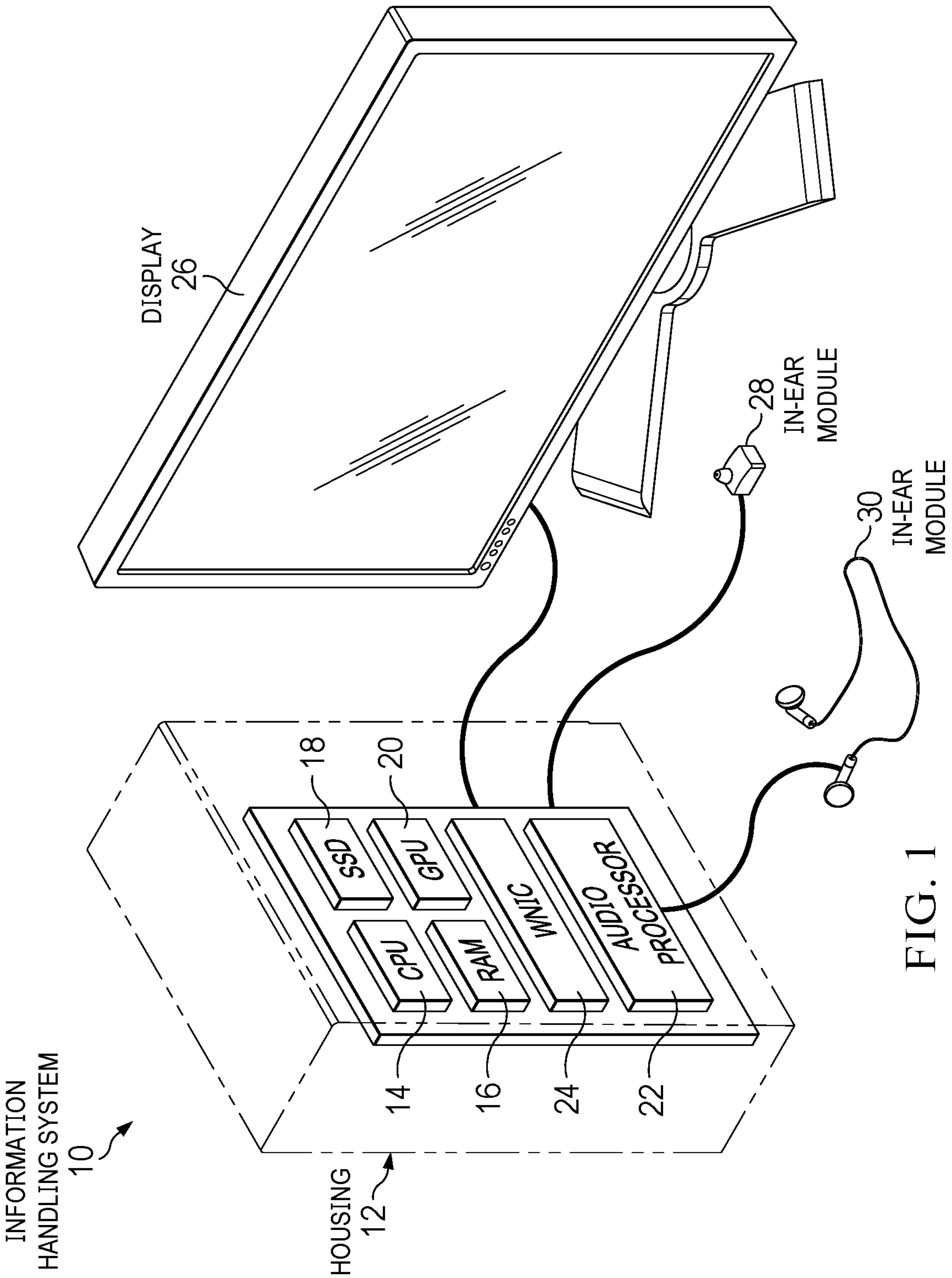
FIG. 1 depicts a block diagram of an information handling system interfaced with an in ear monitor that presents audio information as audible sounds.

Referring now to FIG. 1, a block diagram depicts an information handling system 10 interfaced with an in ear monitor 28 and 30 that presents audio information as audible sounds. Information handling system 10 processes information with processing components disposed in a housing 12, such as stationary or portable housing. A central processing unit (CPU) 14 executes instructions to process information, such as an operating system and applications, in cooperation with a random access memory (RAM) 16 that stores the information and instructions for access by CPU 14. A solid state drive (SSD) 18 provides persistent storage of information and instructions during power down, such as with a flash memory that provides the information and instructions to RAM 16 at power up. A graphics processing unit (GPU) 20 further processes the information to generate pixel values that define visual images for presentation at display 26. An audio processor 22 interfaces with CPU 14 to further process the information to generate audio information that defines audible sounds for presentation at a speaker. In some embodiments, audio processor 22 provides an analog signal to speakers through a cable, such as with in ear module 28. In other instances, audio information is communicated in digital form through a wireless signal, such as from a wireless network interface controller (WNIC) 24, to an in ear module 30, such as with a Bluetooth protocol. In ear module 30 has an ear tip that fits into the end user ear for a secure fit that helps to seal out external sound. The example embodiment depicts a stationary information handling system, however alternative embodiments may include portable information handling systems, such as tablets and mobile phones.

Figure 2:
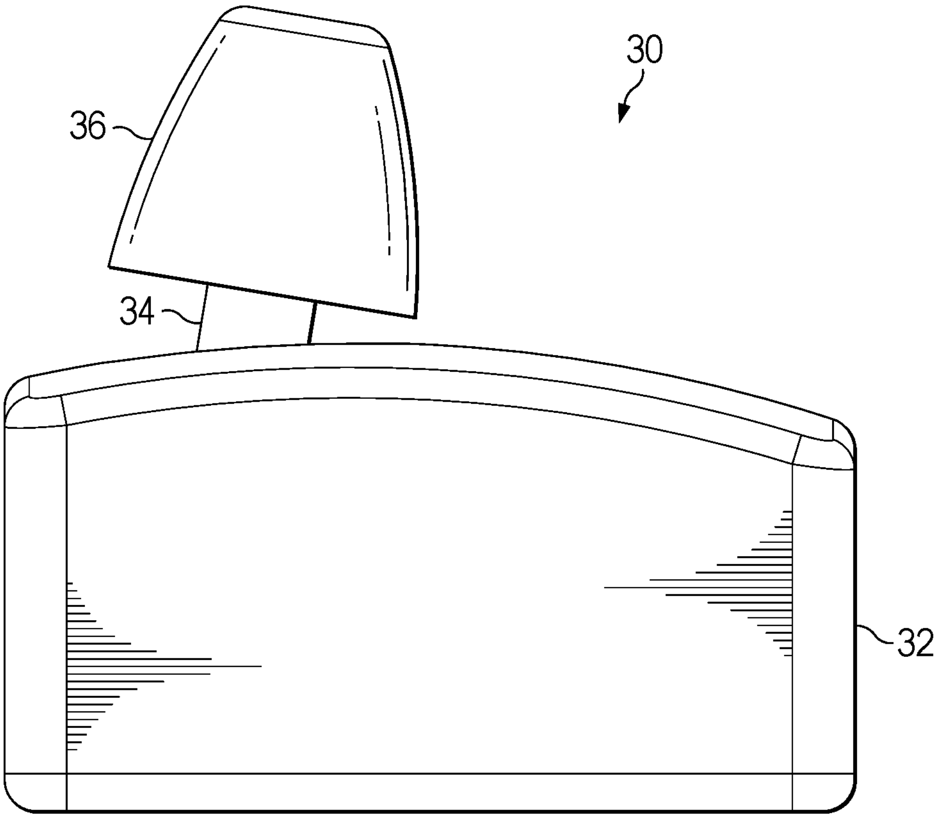
FIG. 2 depicts a side view of the in ear monitor illustrating three selectable angular orientations for the speaker tube and ear tip.

Referring now to FIG. 2, a side view depicts the in ear monitor 30 illustrating three selectable angular orientations for the speaker tube and ear tip. In ear monitor 30 has a speaker housing that includes a speaker for generating an audible sound that is directed through a speaker tube 34 and ear tip 36 for presentation to an end user. In the example embodiment, speaker tube 34 adjusts between three selectable orientations relative to speaker housing 32. A central orientation is 9.35 degrees from the horizontal orientation while left and right orientations are each 3.5 degrees from the central orientation. Each orientation gives a slightly different feel for the end user to provide adjustable comfort based upon the end user preference. Although the example depicts three selectable positions, in alternative embodiments more or fewer positions may be available. Although the example embodiment has an orientation selectable in a range of 7 degrees, alternative embodiments may have a range of 12 degrees. The example embodiment has each of the three selectable positions set with detents so that a preset audio tuning profile is available for each orientation, thus limiting the memory needed to store the audio profiles or adjust the audio profiles for variable orientations without set detents.

Figure 3:
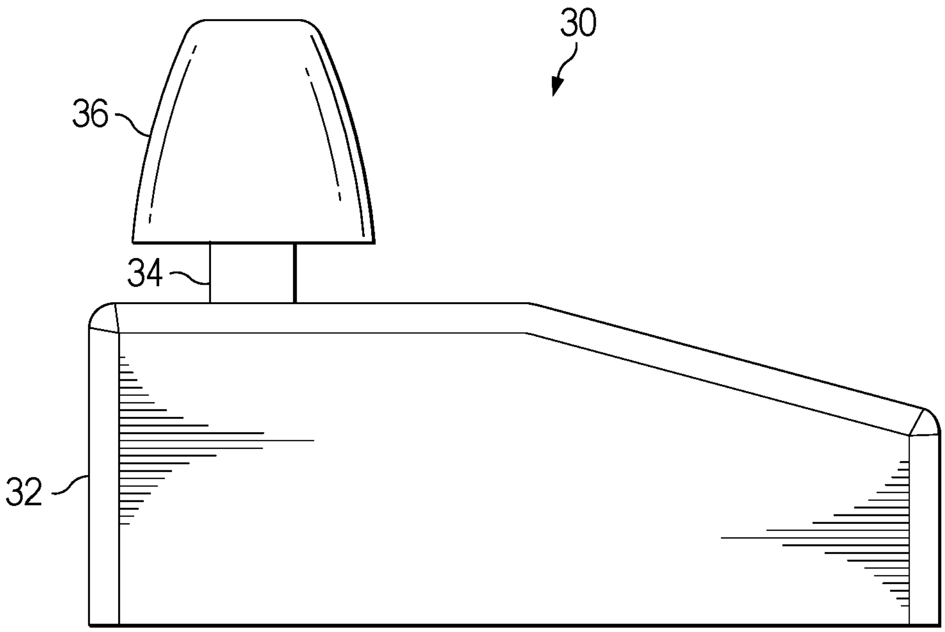
FIG. 3 depicts a side view of the in ear monitor illustrating three selectable vertical extension for the speaker tube and ear tip.

Referring now to FIG. 3, a side view depicts the in ear monitor 30 illustrating three selectable vertical extensions for the speaker tube 34 and ear tip 36. In the example embodiment, ear tip 36 adjusts a distance from speaker housing 32 in 3 1.5 mm increments with a midrange distance of 11.5 mm. Each of the three positions is set with a detent and has a preset audio tuning profile stored in the memory so that audio quality adapts to the end user's selection. In an alternative embodiment, more or fewer preset distances may be available and the distances per increment may also vary. Although FIGS. 2 and 3 depict orientation rotation and vertical distance movements of speaker tube 34 separately, both types of movement may be included in a common speaker housing.

Figure 4A:
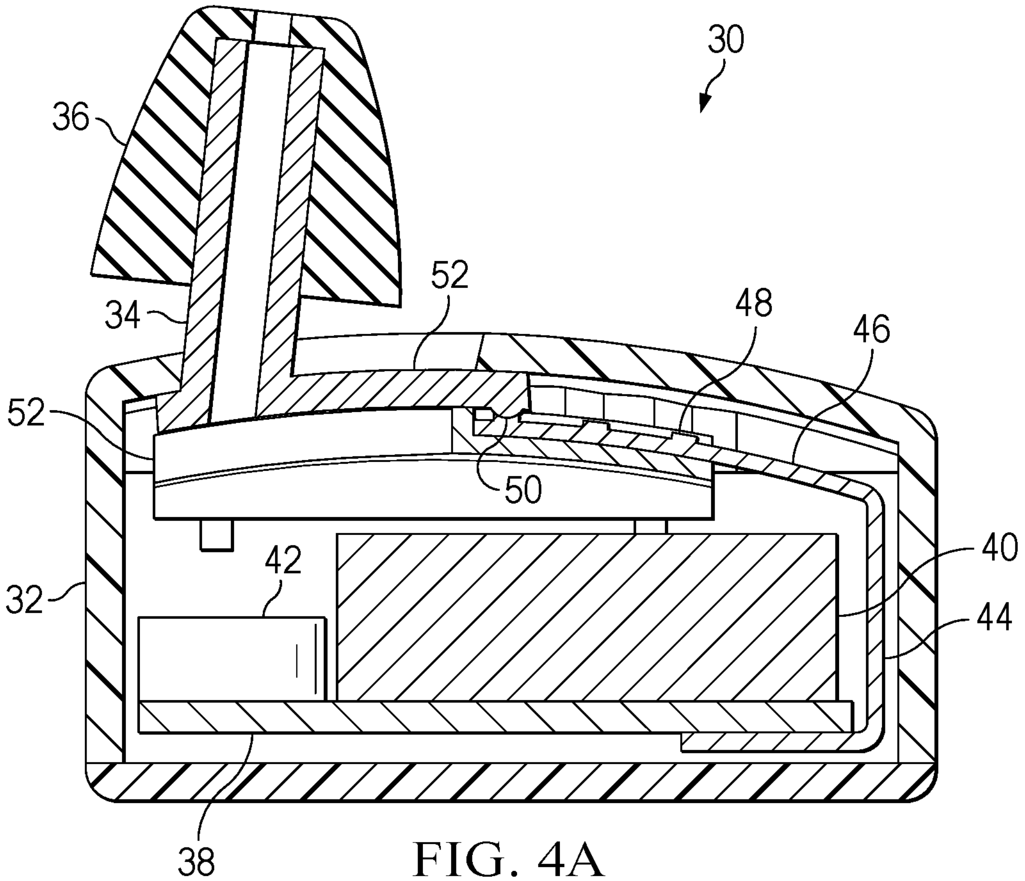
FIGS. 4A, 4B, 4C and 4D depict side cutaway views of an in ear monitor having sliding members to change angular orientations for the speaker tube and ear tip.
Figure 4B:
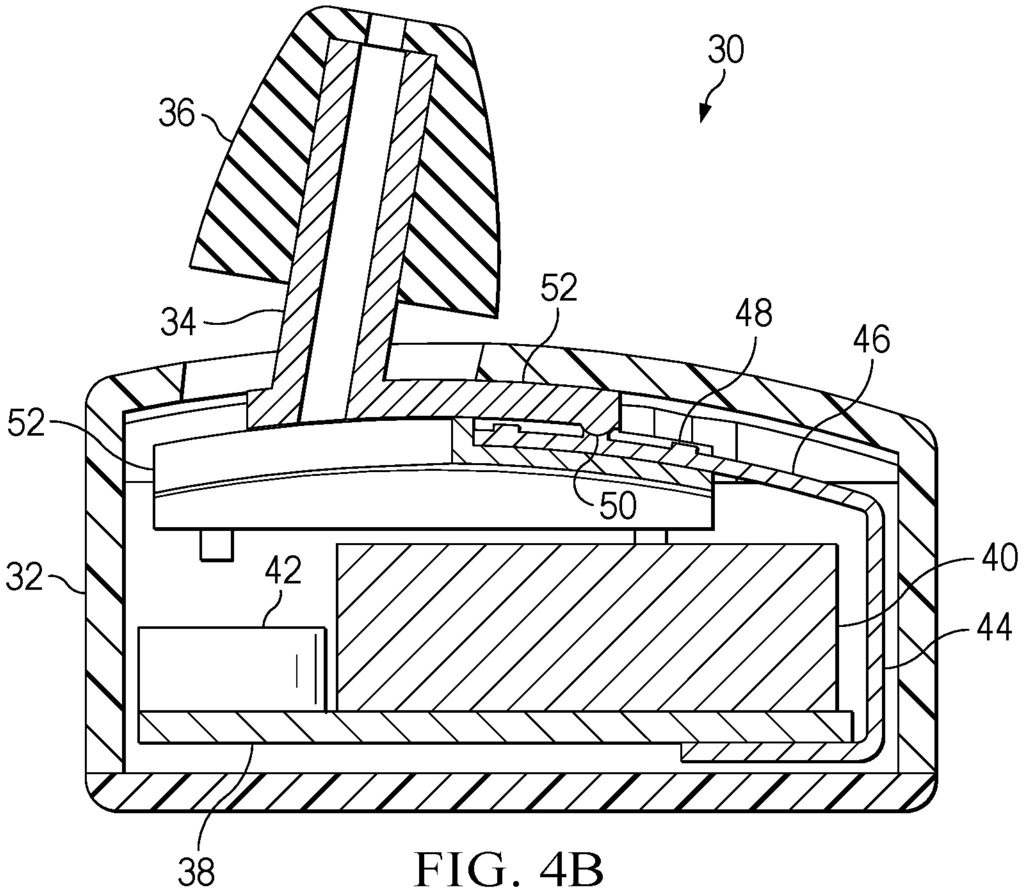
Figure 4C:
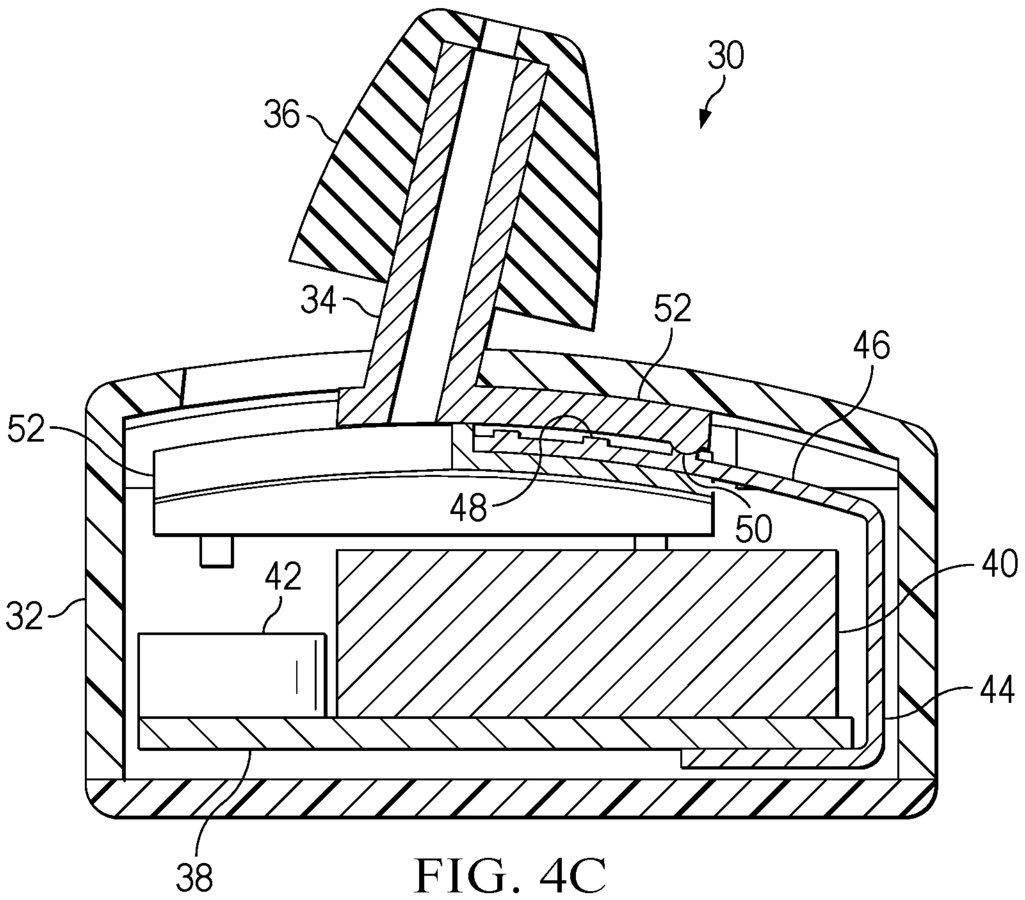

Referring now to FIGS. 4A, 4B, 4C and 4D, side cutaway views depict an in ear monitor 30 having sliding members to change angular orientations for the speaker tube 34 and ear tip 36. FIG. 4A depicts speaker tube 34 in a forward most position and upright most orientation. A speaker 42 generates audible sound within speaker housing 32 that is directed towards and out speaker tube 34 for an end user to hear with ear tip 36 inserted in the end user's ear. A battery 40 powers speaker 42 through a main circuit board 38 along with other components, such as a microphone to provide noise cancellation and a processing resource to manage audio information processing and wireless communications. A position sensor 44 is built from a flexible circuit board 46 interface with main board 38 and three micro force stress sensors 48 that each detect a predetermined pressing force. A first sliding curved member 52 couples with speaker tube 34 and slidingly engages against a second sliding curved member 52. To achieve adjustments in the orientation of speaker tube 34 relative to speaker housing 32, the first curved member slides rearward relative to the stationary secondary curved member to move from alignment with a first detent bump 50 to a second detent bump 50. At alignment with a first detent bump only a first of the micro force sensors 48 has a force applied against it. FIG. 4B depicts sliding movement of the curved members 52 to align a second detent bump 50 with the second micro force sensor. FIG. 4C show a full sliding movement having the curved members so that all three of the micro force sensors 48 align with a detent bump 50. The detent bumps engage the first sliding member at a fixed location associated with activation of a micro force sensor so that the position of speaker tube 34 is known by which of the micro forces sensors are active.

Figure 4D:
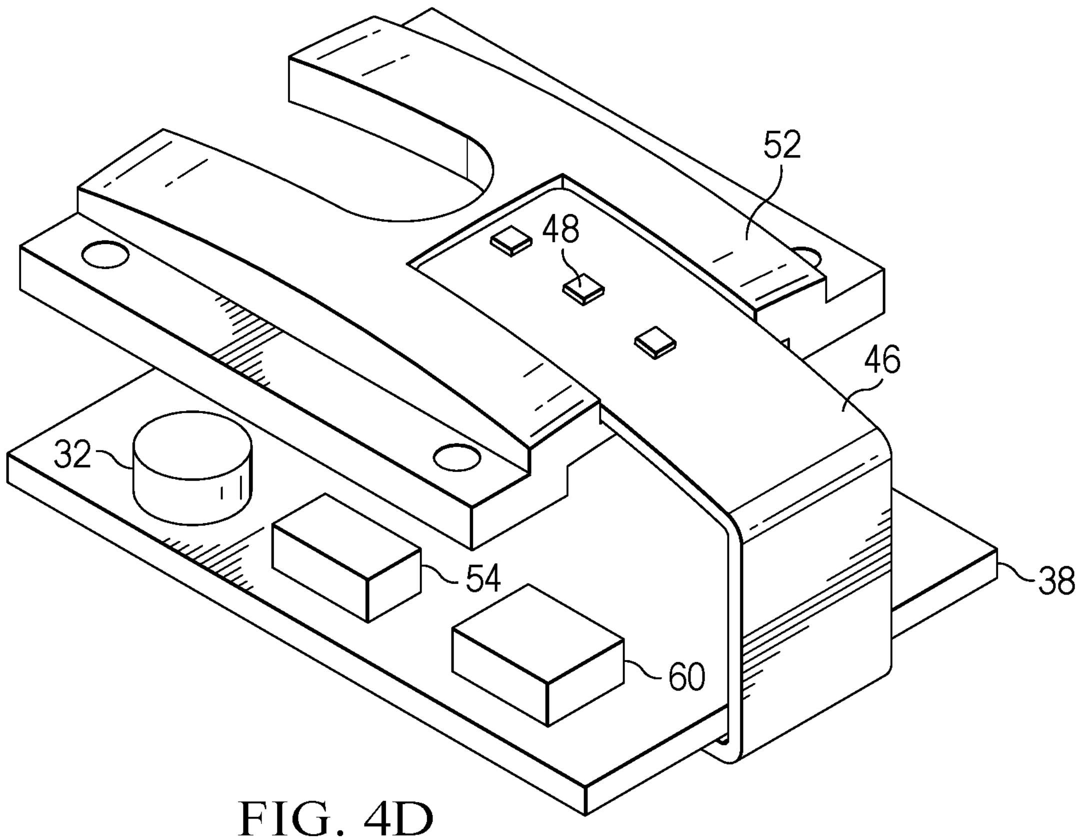

FIG. 4D depicts the second curved member to illustrate rails at the upper surface used to guide the first curved member in the sliding motion. When a micro force sensor 48 detects pressure from the location of the first curved member, a signal is sent through flexible circuit board 46 to main circuit board 38 and audio processor 54 retrieves an audio tuning configuration for the speaker tube location an applies the audio tuning for playback of the audible sounds by speaker 44. Similarly, a microphone 60 detects external sounds for use in noise cancellation by audio processor 54. The noise cancellation is also tuned based upon the detected speaker tube orientation. In the example embodiment, audio processor 54 is a system on chip (SOC) design that includes a processing resource, integrated flash memory and wireless communication support. In alternative embodiments, a separate processing resource may be used. In alternative embodiments, various configurations of sensors may be used to support the position sensor, such as electrical contacts or switches. Further, the number of detents may vary as desired to provide the end user with selectable speaker tube orientations.

Figure 5:
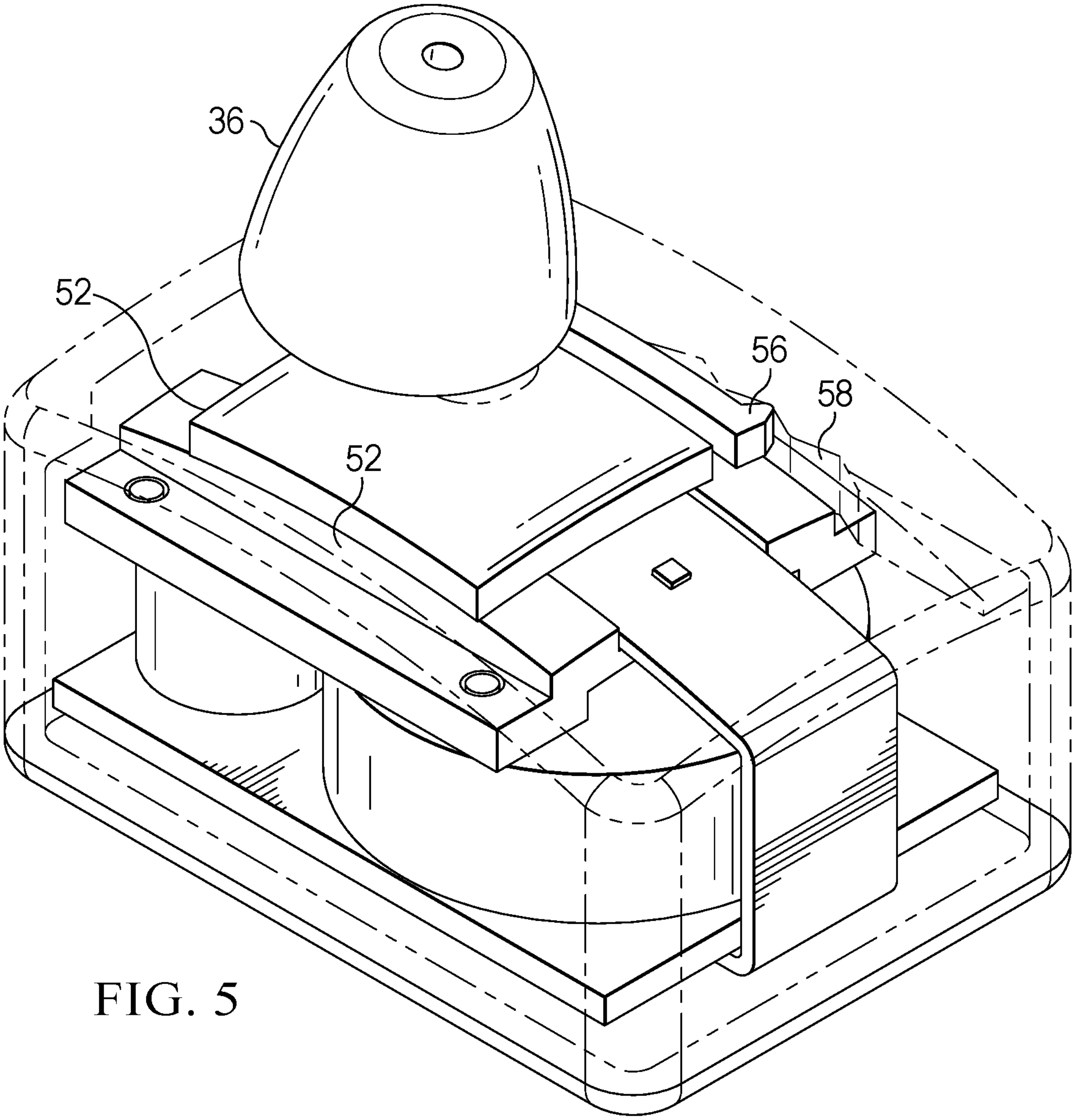
FIG. 5 depicts a side perspective view of the in ear monitor illustrating sliding member engagement to change speaker tube orientation.

Referring now to FIG. 5, a side perspective view depicts the in ear monitor illustrating sliding curved members 52 engagement to change speaker tube orientation. The upper curved member has a latch 56 biased against the speaker housing to engage in slots 58 at the three detents. A micro force sensor is activated when the upper curved member slides to engage latch 56 in a slot so that speaker and noise cancellation tuning are supported for each alignment of ear tip 36. In one embodiment, when the micro force sensor fails to detect a latch and slot alignment, the speaker is disabled to prevent playing of audible sounds when the ear tip position is unknown.

Figure 6:
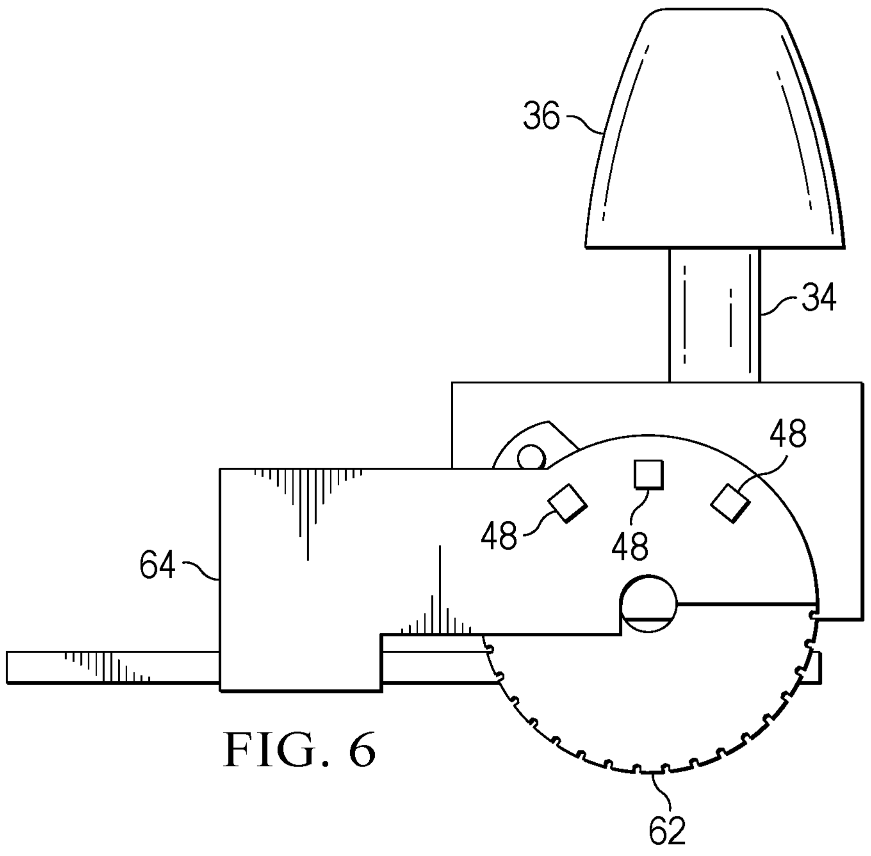
FIG. 6 depicts a side view of a vertical actuator that adjusts the speaker tube distance from the speaker housing.

Referring now to FIG. 6, a side view depicts a vertical actuator that adjusts the speaker tube distance from the speaker housing. In the example embodiment, a circular gear 62 extends slightly out of the speaker housing to be accessible for an end user to turn. Turning of circular gear 62 translates to vertical motion of speaker tube 34 and ear tip 36 to move closer to and further from the speaker housing. A flexible circuit board 64 interfaces with the main circuit board and includes micro force sensors 48 that interact with bumps on circular gear 62 to detect the position of the vertical actuator. As with the change in orientation, detection of vertical distance of ear tube 34 from the speaker housing allows the audio processor to tune the sound generated by the speaker and noise cancellation so that sound at ear tip 36 is optimized.

Figure 7:
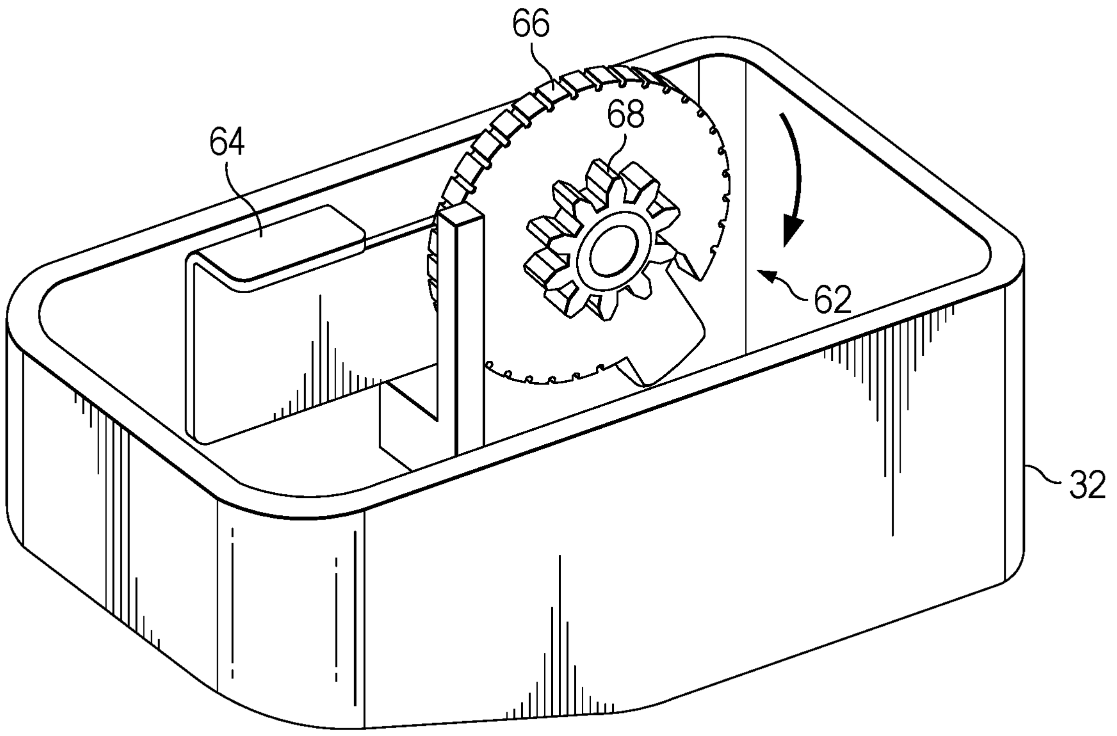
FIG. 7 depicts a bottom view of the vertical actuator for adjusting the ear tube distance.

Referring now to FIG. 7, a bottom view depicts the vertical actuator for adjusting the speaker tube distance. An outer geared surface 66 enhances the end user's grasp of circular gear 62 while an inner gear 68 interacts with a rack coupled to the speaker tube to translate the speaker tube vertically. Flexible circuit board 64 includes the force sensor to detect circular gear 62 rotational orientation that is reported to the main circuit board as a vertical distance value. Detents formed in gear 68 may resist the rotation at predefined heights similar to the detents of the angular orientation, such as the three vertical distances of the example embodiment above.

Figure 8:
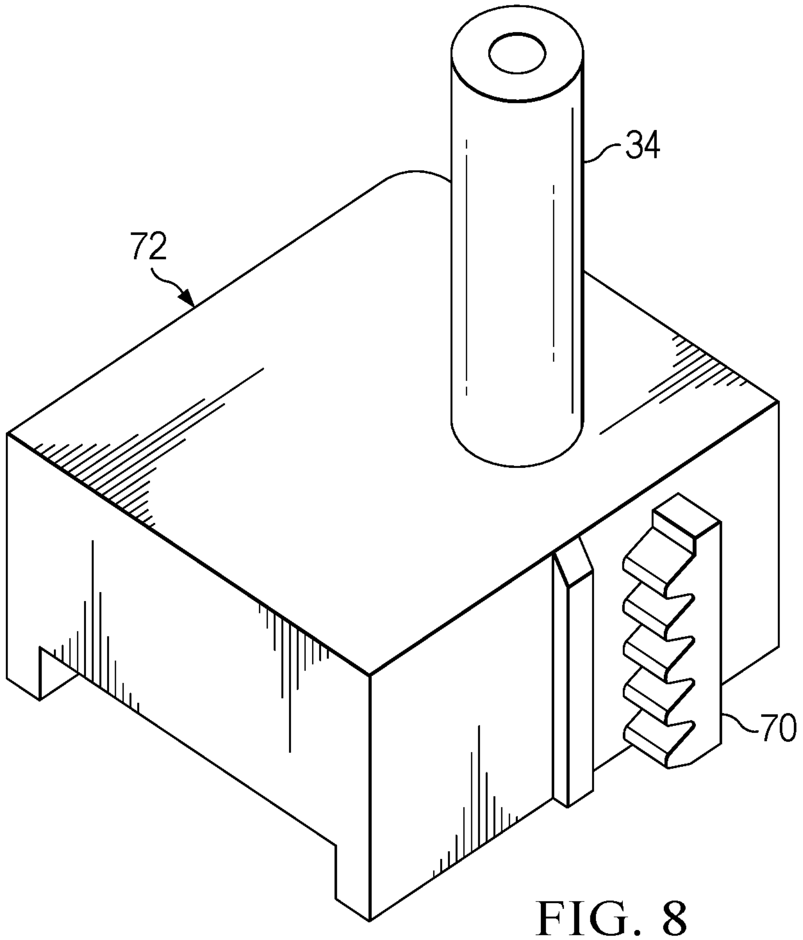
FIG. 8 depicts an upper perspective view of the speaker tube and support with a gear rack to adjust vertical height.

Referring now to FIG. 8, an upper perspective view depicts the speaker tube and support with a gear rack to adjust vertical height. In the example embodiment, speaker tube 34 extends upwards from a speaker box 72, which defines a space that amplifies the sounds generated by the speaker. A rack 70 integrated in the side of speaker box 72 engages with the gear of the vertical actuator to translate rotation of the circular gear into vertical movement.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor disposed in the housing and operable to execute instructions that process information;

a memory disposed in the housing and interfaced with the processor, the memory operable to store the instructions and information;

an audio processor interfaced with the processor and operable to further process the information for presentation as audible sounds played by a speaker; and an in-ear monitor having a speaker housing, a speaker disposed in the housing and interfaced with the audio processor to generate the audible sounds, a speaker tube interfaced with the speaker to direct the audible sounds from the speaker to an exterior of the speaker housing, an ear tip coupled to the speaker tube exterior the speaker housing and an alignment mechanism coupled to the speaker tube and configured to adjust the speaker tube angular alignment relative to the speaker housing between plural angular orientations.

2. The information handling system of claim 1 wherein the alignment mechanism comprises:

a first sliding member coupled to the housing; and a second sliding member coupled to the speaker tube and engaged against the first sliding member, the first and second sliding members sliding relative to each other to change the speaker tube angular orientation.

3. The information handling system of claim 2 wherein the first and second sliding members each have a curved shape.

4. The information handling system of claim 1 further comprising:

a circuit board disposed proximate the first and second sliding members; and a position sensor coupled to the circuit board and configured to detect at least first and second sliding member positions associated with first and second speaker tube angular orientations.

5. The information handling system of claim 4 wherein the position sensor comprises at least first and second micro force sensors configured to detect the first and second sliding member positions.

6. The information system of claim 4 wherein the position sensors interface with the audio processor, the audio processor operable to adjust the audible sounds based upon the speaker tube angular orientation.

7. The information handling system of claim 6 further comprising:

a microphone interfaced with the audio processor and operable to detect sounds external to the speaker housing;

wherein the audio processor performs noise canceling on sound detected by the microphone and adjusted by the detected speaker tube orientation.

8. The information handling system of claim 1 further comprising:

a vertical actuator interfaced with the speaker tube and operable adjust a distance between the speaker housing and ear tip.

9. The information handling system of claim 8 further comprising:

a microphone interfaced with the audio processor and operable to detect sounds external to the speaker housing;

wherein the audio processor performs noise canceling on sound detected by the microphone and adjusted by the detected speaker tube distance between the speaker housing and ear tip.

10. A method for adjusting an in-ear monitor, the method comprising:

coupling a speaker tube to a first sliding member;

coupling a second sliding member to a speaker housing of the in-ear monitor; and engaging the first and second sliding members to slide relative to each other and thereby adjust an orientation of the speaker tube relative to the speaker housing.

11. The method of claim 10 further comprising:

interfacing a position sensor with the first and second sliding members to detect the orientation; and adjusting the sound output by a speaker audibly coupled to the speaker tube based upon the detected orientation.

12. The method of claim 11 further comprising:

monitoring sounds external to the speaker housing with a microphone disposed in the speaker housing; and noise canceling of sound output by the speaker based upon the monitoring sounds external to the speaker and the detected orientation.

13. The method of claim 12 wherein the position sensor comprises at least first and second micro force sensors at first and second orientations.

14. The method of claim 11 further comprising:

detecting when the speaker tube has the first and second orientations; and turning off audible sounds from the speaker when the speaker tube is between the first and second orientations.

15. The method of claim 10 further comprising:

coupling a vertical actuator to the speaker tube; and interfacing a vertical position sensor with the with the speaker tube to detect vertical extension of the speaker tube relative to the speaker housing.

16. The method of claim 15 further comprising adjusting the sound output by a speaker audibly coupled to the speaker tube based upon the detected vertical extension.

17. An in-ear monitor comprising:

a speaker housing;

a speaker disposed in the housing and operable to generate audible sound from audio information;

an audio processor interfaced with the speaker and operable to generate the audible information;

a speaker tube interfaced with the speaker to direct the audible sounds from the speaker to exterior the speaker housing;

an ear tip coupled to the speaker tube exterior the speaker housing; and an alignment mechanism coupled to the speaker tube and configured to adjust the speaker tube angular alignment relative to the speaker housing between plural angular orientations.

18. The in-ear monitor of claim 17 wherein the alignment mechanism comprises:

a first sliding member coupled to the housing; and a second sliding member coupled to the speaker tube and engaged against the first sliding member, the first and second sliding members sliding relative to each other to change the speaker tube angular orientation.

19. The in-ear monitor of claim 17 further comprising:

a circuit board disposed proximate the first and second sliding members; and a position sensor coupled to the circuit board and configured to detect at least first and second sliding member positions associated with first and second speaker tube angular orientations.

20. The in-ear monitor of claim 19 wherein the position sensors interface with the audio processor, the audio processor operable to adjust the audible sounds based upon the speaker tube angular orientation.

* * * * *